(12) United States Patent
Longo

(10) Patent No.: US 8,710,956 B2
(45) Date of Patent: Apr. 29, 2014

(54) FINGERPRINTING APPARATUS, SYSTEM, AND METHOD

(76) Inventor: Leonard P. Longo, Bridgeville, PA (US)

(*) Notice: Subject to any disclaimer, the term of this patent is extended or adjusted under 35 U.S.C. 154(b) by 188 days.

(21) Appl. No.: 13/154,064

(22) Filed: Jun. 6, 2011

(65) Prior Publication Data

US 2012/0306619 A1 Dec. 6, 2012

(51) Int. Cl.
*G05B 19/00* (2006.01)

(52) U.S. Cl.
USPC ......... 340/5.83; 340/5.8; 340/5.81; 340/5.82; 340/5.52; 340/5.53; 382/115; 382/116; 382/117; 382/118; 382/124

(58) Field of Classification Search
USPC ................................................ 340/5.8, 5.72
See application file for complete search history.

(56) References Cited

U.S. PATENT DOCUMENTS

| | | | |
|---|---|---|---|
| 6,271,745 B1 | 8/2001 | Anzai et al. | |
| 6,720,712 B2 | 4/2004 | Scott et al. | |
| 6,727,800 B1 | 4/2004 | Dutu | |
| 6,886,104 B1 | 4/2005 | McClurg et al. | |
| 6,927,671 B2* | 8/2005 | DeBono | 340/5.83 |
| 6,980,672 B2 | 12/2005 | Saito et al. | |
| 7,073,711 B2 | 7/2006 | Fernandez et al. | |
| 7,290,323 B2 | 11/2007 | Deconde et al. | |
| 7,352,290 B2 | 4/2008 | Eskridge | |
| 7,398,549 B2* | 7/2008 | Ting | 726/5 |
| 7,910,902 B2 | 3/2011 | Dinh | |
| 7,920,728 B2 | 4/2011 | Chen | |
| 2004/0208345 A1* | 10/2004 | Chou et al. | 382/124 |
| 2005/0232471 A1* | 10/2005 | Baer | 382/115 |
| 2006/0202797 A1 | 9/2006 | Theis et al. | |
| 2007/0154073 A1* | 7/2007 | Hamid et al. | 382/124 |
| 2009/0226052 A1* | 9/2009 | Fedele et al. | 382/125 |
| 2010/0109838 A1* | 5/2010 | Fisher | 340/5.72 |
| 2010/0265040 A1* | 10/2010 | Kato | 340/5.83 |
| 2011/0032077 A1* | 2/2011 | Setlak et al. | 340/5.83 |

OTHER PUBLICATIONS

Marcos Faúndez-Zanuy, "Are Inkless Fingerprint Sensors Suitable for Mobile Use?" *IEEE A&E Systems Magazine*, Apr. 2004, 5 pages.
"IBIS Mobile Identification System," printed from http://www.identix.com/products/pro_mobile.html, Internet site, accessed on Apr. 6, 2006, 1 page.
"IBIS—System Overview," printed from http://www.identix.com/products/pro_mobile_ibis.html, Internet site, accessed on Apr. 6, 2006, 1 page.
"IBIS—How it Works," printed from http://www.identix.com/products/pro_mobile_IBIS_config.html, Internet site, accessed on Apr. 6, 2006, 1 page.
"IBIS—Specifications," printed from http://www.identix.com/products/pro_mobile_IBIS_ts.html, Internet site, accessed on Apr. 6, 2006, 2 pages.

(Continued)

*Primary Examiner* — George Bugg
*Assistant Examiner* — Matthew Taylor
(74) *Attorney, Agent, or Firm* — K&L Gates LLP

(57) ABSTRACT

An apparatus, system and method for surreptitious biometric acquisition are disclosed. In one embodiment, a sensor is configured to produce an electrical signal corresponding to a biometric signature of a subject. The sensor is configured to be surreptitiously mounted to a surface. Various sensors are disclosed as being operative with the surreptitious biometric acquisition apparatus. A vehicle with a surreptitiously mounted biometric acquisition apparatus is disclosed. A method for surreptitious identification of suspects is also disclosed.

24 Claims, 14 Drawing Sheets

(56) References Cited

OTHER PUBLICATIONS

"Solve More Crimes with Superior Identification Tools," printed from http://www.identix.com/industries/law/, Internet site, accessed on Apr. 6, 2006, 2 pages.

"Investor Relations Press Releases," printed from http://www.shareholder.com/identix/releases.cfm?Year=2002, Internet site, accessed on Apr. 6, 2006, 4 pages.

Trudy Walsh, "Prints on patrol: Minnesota county puts fingerprint system into squad cars," *Government Computer News*, printed from http://www.gcn.com/print/23_30/27515-1.html, Internet site, accessed on Apr. 6, 2006, 4 pages.

"Transparent conducting film," printed from *Wikipedia*, Apr. 2011, 7 pages.

"How the iPhone Works," printed from http://electronics.howstuffworks.com/iphone.htm/printable, Internet site, accessed on Jun. 6, 2011, 8 pages.

"DragonPlate Carbon Fiber Sheets," printed from http://dragonplate.com/ecart/categories.asp?cID=65, Internet site, accessed on Dec. 22, 2010, 2 pages.

\* cited by examiner

US 8,710,956 B2

FINGERPRINTING APPARATUS, SYSTEM, AND METHOD

BACKGROUND

Obtaining fast and accurate identification of a subject has always been a concern of public and private security institutions, including, without limitation, law enforcement, military, private security, among other personnel. Obtaining fast and accurate identification of a subject including any prior and current history of the subject can be useful to law enforcement, military, private security, among other personnel, associated with public and private security institutions.

Biometric scanners are available which can capture an image of a fingerprint or palm-print. A signal representative of the captured image is sent over a data communication interface to a host computer for further processing. For example, the host can perform a one-to-one or one-to-many fingerprint matching.

Current fingerprinting devices for use in the field present issues of safety and use. Handheld scanners can be cumbersome and do not leave hands free for rapid response to changing conditions. Handheld scanners also require police to come within arms-reach of a suspect. Additionally, current fingerprinting devices cannot be used unobtrusively to identify suspects without arousing suspicion.

Accordingly, there is a need for surreptitious biometric identification capabilities for use in the field.

SUMMARY

Methods and apparatus for surreptitiously identifying a suspect are disclosed.

In one embodiment, a sensor is configured to produce an electrical signal corresponding to a biometrics signature of a subject. The sensor is configured to be surreptitiously mounted to a surface. The surface may be, but is not limited to, the surface of a vehicle, a door surface, or a surface that comes into frequent contact with a biometric signature.

In various embodiments, a biometric sensor may comprise a capacitive sensor, thermal sensor, electromagnetic sensor, optical sensor, or ultrasonic sensor, among others.

In one embodiment, a surreptitious biometric acquisition apparatus is mounted to an entry point of a building to assist in entry-exit control. The surreptitious biometric acquisition apparatus may be mounted to a door handle or other surface that commonly comes into contact with biometric signatures. In another embodiment, a surreptitious biometric acquisition apparatus is mounted to the surface of a vehicle, such as a police vehicle. The surreptitious biometric acquisition apparatus is formed integrally with the surface of the vehicle.

In one embodiment, a method for surreptitiously identifying a suspect comprises obtaining an analog signal representing biometric data of the subject. The analog signal is converted into a digital signal by a signal processing module. The digital signal is then transmitted to a first processing node, where it is processed for later comparison. The processed signal is then transmitted to a database of known biometric information, where the biometric signature is compared to the known information in the database. If a match is found, the database then transmits identifying information of the subject to the first processing module for display. If no match is found, a no match indicator is transmitted instead.

BRIEF DESCRIPTION OF THE DRAWINGS

The novel features of the various embodiments are set forth with particularity in the appended claims. The various embodiments, however, both as to organization and methods of operation may be best understood with reference to the following description, taken in conjunction with the accompanying drawings.

DESCRIPTION

Various embodiments of a surreptitious biometric acquisition apparatus, as disclosed herein, can be used for identification of subjects. Identifying subjects through biometric data can be useful in a variety of situations including, but not limited too, law enforcement, military, and private security.

Figure 1:
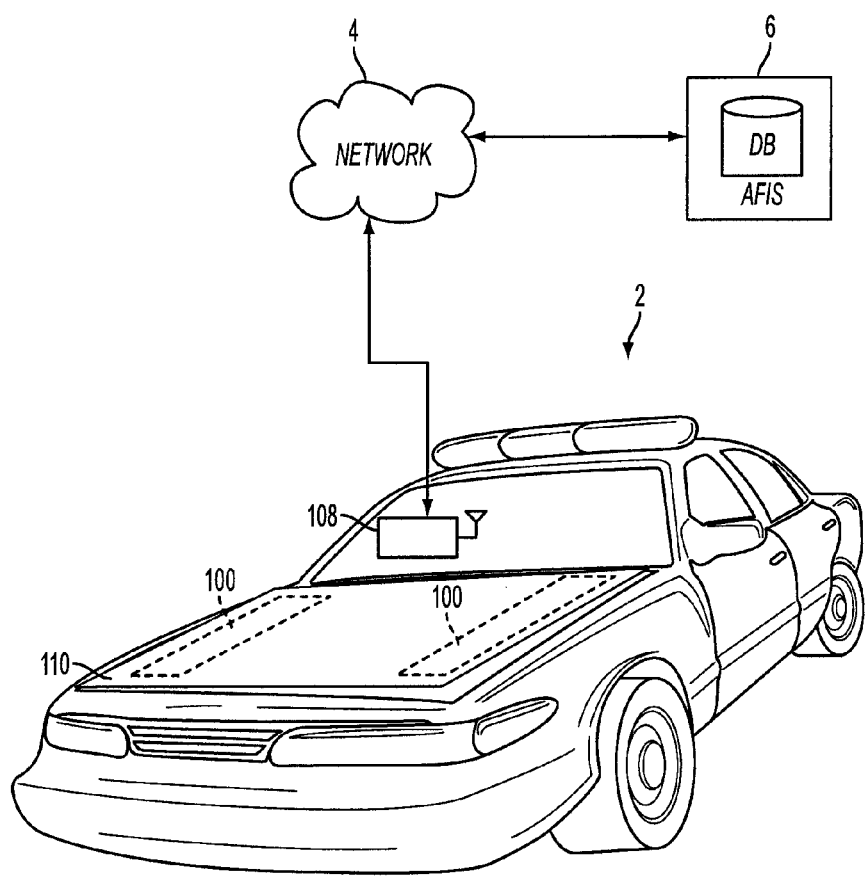
FIG. 1 is one embodiment of a surreptitious biometric acquisition apparatus embedded in a vehicle.

In one embodiment of a surreptitious biometric acquisition apparatus, illustrated in FIG. 1 a biometric acquisition module 100 is formed integrally with the surface of a vehicle 2. In the embodiment illustrated in FIG. 1, the biometric acquisition module 100 is formed integrally with a hood 110 of the vehicle 2. In other embodiments, the biometric acquisition module 100 may be formed with any suitable surface of the vehicle 2, including but not limited to the trunk, the roof, or side panels. The biometric acquisition module 100 is communicatively coupled to a first node 108. In one embodiment, communication between the biometric acquisition module 100 and the first node 108 can be, for example, a wired or wireless connection. The first node 108 is configured to receive a signal from the biometric acquisition module 100 that contains biometric data associated with a suspect that has come in contact with the biometric acquisition module 100. In one embodiment, the first node 108 can be a laptop computer located inside of the vehicle 2. In another embodiment, the first node 108 can be an independent system installed into the vehicle specifically configured for biometric identification. The first node 108 is configured to transmit the biometric data to a biometric database 6 via a network 4.

The biometric database 6 can be any suitable database containing biometric and identifying information of subjects. In one embodiment, the biometric database 6 can be a government-maintained identification database, for example, Automated Fingerprint Identification Systems (AFIS), Integrated Automated Fingerprint Identification System (IAFIS), Eurodac Fingerprint Database, or any other government biometric database. In another embodiment, the biometric database 6 can be a privately built and maintained biometric database, for example, created by an employer containing biometric data of employees. The biometric database 6 compares the received biometric signal with stored data, e.g., biometric and identifying information of subjects, and transmits the results of the search back to the first node 108, or other nodes, for example. In one embodiment, biometric database 6 transmits the results of the search to the first node 108. In one embodiment, the first node 108 can then display the match information to the police officer, for example, by displaying the subject's identity on the screen of an in-car laptop computer.

Figure 2:
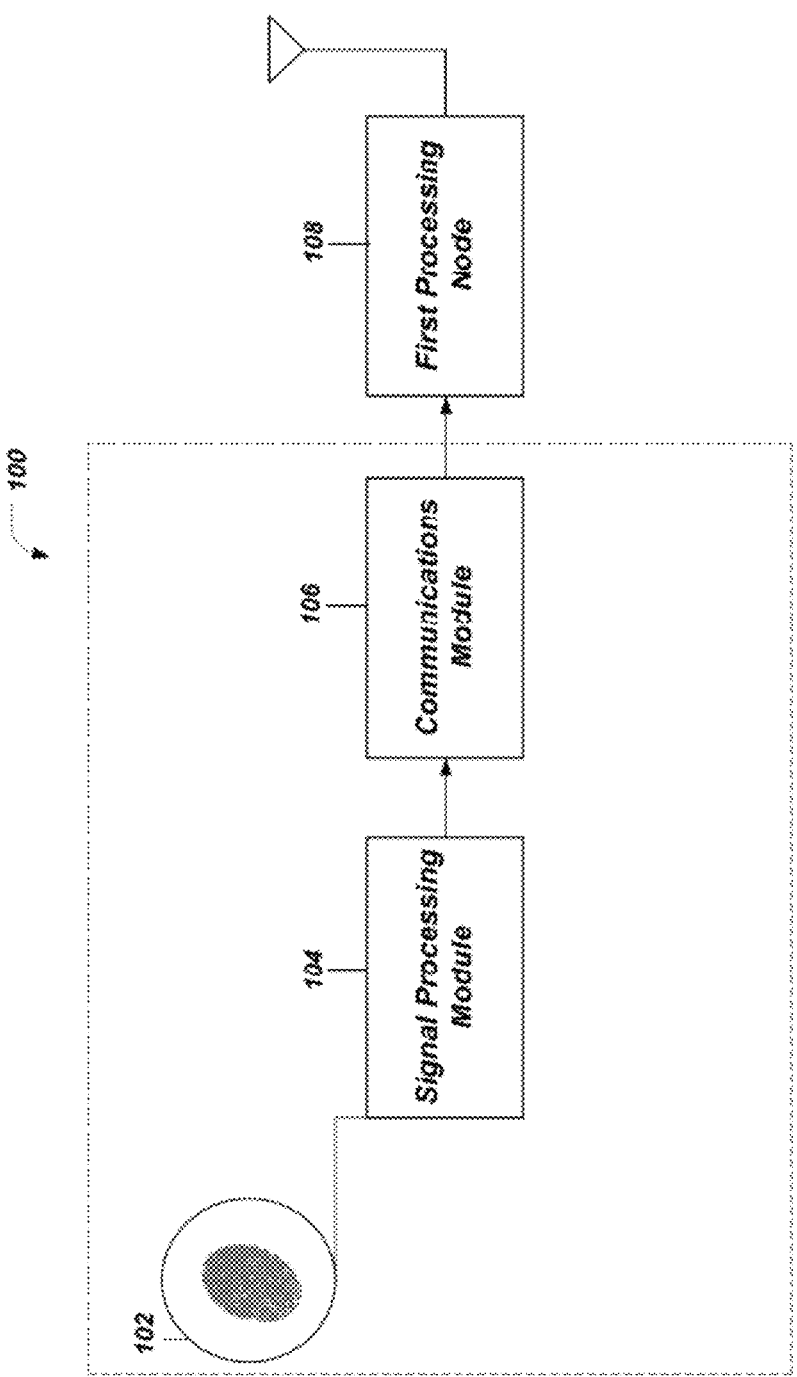
FIG. 2 is one embodiment of a surreptitious biometric acquisition apparatus embedded in a vehicle.

FIG. 2 shows a diagram of one embodiment of a biometric acquisition apparatus 100. In one embodiment, a biometric sensor 102 is configured to obtain a signal representing the biometric data of a subject that contacts the biometric sensor 102. In one embodiment, the biometric sensor 102 may be any suitable biometric sensor capable of obtaining biometric data surreptitiously. For example, the biometric sensor 102 may be a capacitive sensor, thermal sensor, electromagnetic sensor, optical sensor, ultrasonic sensor, or any combination of sensors. The biometric sensor 102 transmits the signal representing biometric data of a subject to a signal processing module 104. In one embodiment, the biometric sensor 102 may be formed integrally with the signal processing module 104. In another embodiment, the biometric sensor 102 may be located separately from the signal processing module 104. The signal processing module 104 converts the analog signal received from the biometric sensor 102 into a digital form. The signal processing module 104 transmits the digital signal representing biometric data of a subject to the communications module 106.

Figure 3A:
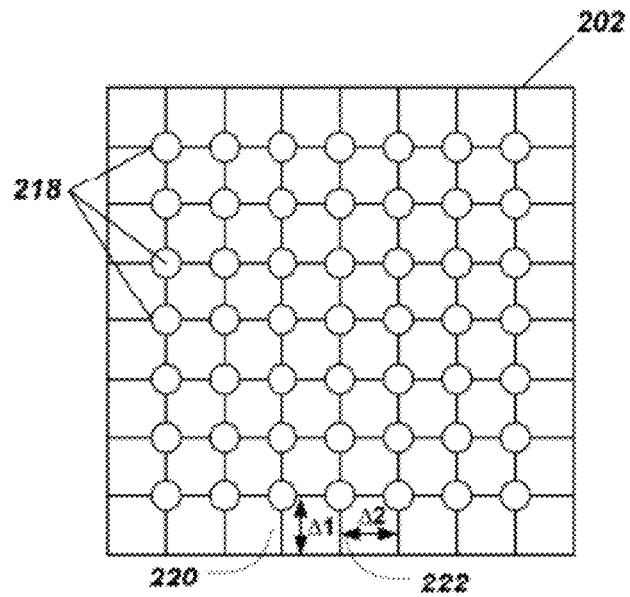
FIG. 3A is one embodiment of a capacitive biometric sensor.
Figure 3B:
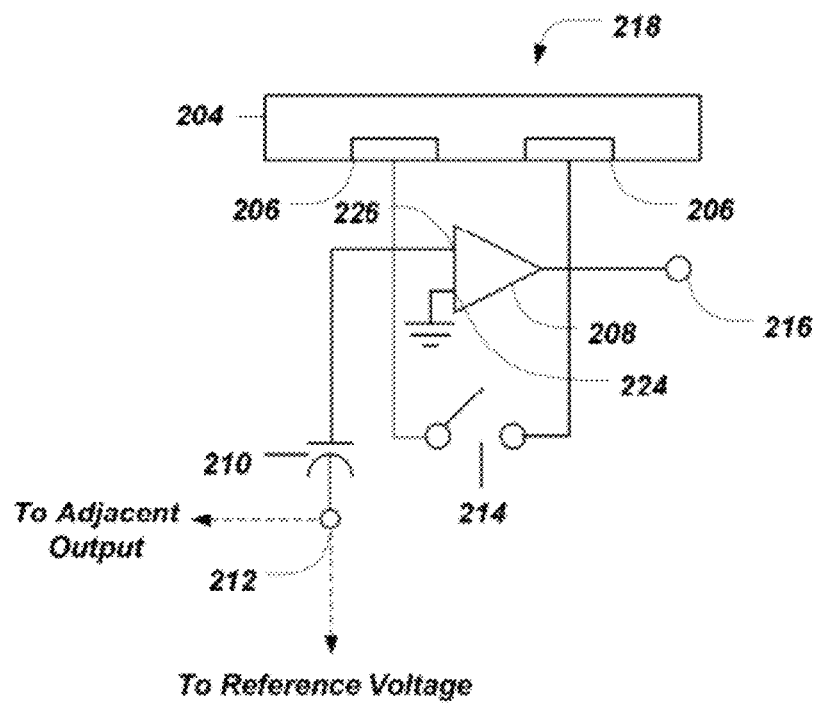
FIG. 3B is a diagram of a capacitive element.

FIGS. 3A-3B show one embodiment of a biometric sensor comprising a capacitive biometric sensor 202. In one embodiment, the capacitive biometric sensor 202 is comprised of one or more capacitive elements 218 arranged in a grid. The capacitive grid has a first spacing 220 and a second spacing 222, both of which are configured to be small enough to give a proper resolution for biometric sensing. In one embodiment the first spacing 220 is equal to the second spacing 222. In another embodiment, the first spacing 220 is different than the second spacing 222. Although the capacitive biometric sensor 202 is shown as a square, it will be appreciated by one of skill in the art that the capacitive biometric sensor 202 can be configured to any shape suitable for surreptitious application to a surface, including, but not limited to, rectangular, circular, oval, triangular, rhomboidal, or irregular. In addition, it will be appreciated by one of skill in the art that the capacitive biometric sensor 202 grid can be varied with the shape of the capacitive biometric sensor 202.

FIG. 3B shows one embodiment of capacitive element 218. A reference voltage 212 is connected to an input terminal of an amplifier 208. In one embodiment, the amplifier 208 is an inverting operational amplifier. In one embodiment, the reference voltage 212 is connected to an inverting terminal 226 of the amplifier 208 and a non-inverting terminal 224 is connected to ground. In one embodiment, the reference voltage 212 can be connected to a reference voltage source, such as a battery. In another embodiment, the reference voltage 212 can be connected to the output of an adjacent capacitive element 218. Reference voltage 212 may be connected to the input terminal through input capacitor 210 in order to reduce ripple in the input voltage. First and second capacitive plates 206A and 206B, in conjunction with the reference voltage 212, form a feedback loop for the amplifier 208.

The capacitive biometric sensor 202 operates as follows: a suspect places a biometric signature, e.g., finger with fingerprint or palm with palm-print, on top of an insulating layer 204. A switch 214 is closed by the sensor 202, causing a short circuit between the inverting terminal 226 and the output voltage 216. This causes the circuit to be in a balanced state, wherein the output voltage 216 is equal to the reference voltage 212. The switch 214 is then opened, which causes the reference voltage 212 to charge the first and second capacitive plates 206A and 206B. The presence of a biometric signature, e.g., finger with fingerprint, acts as a third capacitive plate and causes the capacitance of the feedback loop to vary. The capacitance varies with respect to whether a biometric ridge or valley is present. The variance in capacitance between the first and second capacitive plates 206A, 206B and the biometric signature causes a variation in the voltage at the inverting terminal 226, which in turn causes a variation in the output voltage 216. This variation can be interpreted by the signal processing module 104 (FIG. 2) as indicating a ridge or valley of a biometric signature. Referring back to FIG. 3A, a complete image of the suspect's biometric signature is developed by the signal processing module 104 (FIG. 2) by interpreting the output voltage 216 of each of the capacitive elements 218 in the array of the capacitive biometric sensor 202.

In one embodiment, the insulating layer 204 may comprise a transparent conducting film (TCF), which may be fabricated from either organic or inorganic materials. Inorganic films may comprise a layer of transparent conducting oxide (TCO), generally in the form of indium tin oxide (ITO), fluorine doped tin oxide (FTO), and doped zinc oxide. Organic films may be constructed of carbon nanotube networks and graphene. Transparent conducting films act both as a window for light to pass through to the active material beneath and as an ohmic contact for carrier transport out of the photovoltaic. Transparent materials possess bandgaps with energies corresponding to wavelengths which are shorter than the visible range (380 nm to 750 nm). As such, photons with energies below the bandgap are not collected by these materials and this visible light passes through.

In one embodiment, the insulating layer 204 may comprise a transparent conductive oxide. Transparent conductive oxides (TCO) are doped metal oxides used in optoelectronic devices. TCO films may be fabricated with polycrystalline or amorphous microstructures. TCO films may use electrode materials that have greater than 80% transmittance of incident light, for example, as well as conductiveness higher than $10^3$ S/cm, for example. The transmittance of TCO films, just as in any transparent material, is limited by light scattering at defects and grain boundaries. Mobility in TCO films is limited by ionized impurity scattering, and may be on the order of 40 $cm^2/(V*s)$ for example. In one embodiment, TCO films may be made from n-type conductors. TCO films may be manufactured from, for example, tin-doped indium-oxide (ITO), aluminum-doped zinc-oxide (AZO), or indium-doped cadmium-oxide, or binary metal oxides without any intentional impurity doping. Binary metal oxides may be n-type with a carrier concentration on the order of $10^{20}$ $cm^{-3}$.

Doped metal oxides for use as transparent conducting layers may be grown on glass substrates. The glass substrate, apart from providing a support that the oxide can grow on, has the additional benefit of blocking most infrared wavelengths greater than 2 μm for most silicates, and converting it to heat in the glass layer. This process helps maintain a low temperature of active region of the TCO. TCO films may be deposited on a substrate through various deposition methods, including metal organic chemical vapor deposition (MOCVD), metal organic molecular beam deposition (MOMBD), spray pyrolysis, pulsed laser deposition (PLD), or magnetron sputtering of the film. Magnetron sputtering is very inefficient, with only 30% of the material actually being deposited on the substrate. In the case of ITO, this inefficiency is a significant drawback. TCO growth may be performed in a reducing environment to encourage oxygen vacancy formation within the film, which contribute to the carrier concentration (if n-type).

Charge carriers in these oxides arise from three fundamental sources: interstitial metal ion impurities, oxygen vacancies, and doping ions. The first two sources always act as electron donors In one embodiment, TCO films may be fabricated solely using these two intrinsic sources as carrier generators. When an oxygen vacancy is present in the lattice it acts as a doubly-charged electron donor. In ITO, for example, each oxygen vacancy causes the neighboring In3+ ion 5s orbitals to be stabilized from the 5s conduction band by the missing bonds to the oxygen ion, while two electrons are trapped at the site due to charge neutrality effects. The stabilization of the 5s orbitals causes a formation of donor level for the oxygen ion, determined to be 0.03 eV below the conduction band.

Dopant ionization within the oxide occurs in the same way as in other semiconductor crystals. Shallow donors near the conduction band (n-type) allow electrons to be thermally excited into the conduction band, while acceptors near the valence band (p-type) allow electrons to jump from the valence band to the acceptor level, populating the valence band with holes. Charged impurity ions and point defects have scattering cross-sections that are much greater than their neutral counterparts. Increasing the scattering decreases the mean-free path of the carriers in the oxide, which leads to poor device performance and a high resistivity.

In one embodiment, the insulating layer 204 may comprise a transparent conducting polymer. Transparent conducting polymers (TCP) have conjugated double bonds which allow for conduction. The effective bandgap is the separation between the highest occupied molecular orbital and lowest unoccupied molecular orbital. TCPs have conductivity below that of TCOs and have low absorption of the visible spectrum allowing them to act as transparent conductors. The TCPs can be made into flexible films making them desirable despite their low conductivity. This makes them useful in the development of flexible electronics, such as biometric sensors, where traditional transparent conductors will fail. TCP films may be fabricated from, for example, Poly(3,4-ethylenedioxythiophene) (PEDOT), doped-PEDOT with poly(styrene sulfonate), Poly(4,4-ethylenedioxythiophene), or Poly(4,4-ethylenedioxythiophene) doped with iodine or 2,3-dichloro-5,6-dicyano 1,4-benzoquinone (DDQ).

In one embodiment, the insulating layer 204 may comprise a carbon nanotube (CNT) film. CNT films have high elastic modulus, high tensile strength, and high conductivity. CNT films may be prepared in three steps: the CNT growth process, putting the CNTs in solution, and finally, creation of the CNT thin film. Nanotubes may be grown using laser ablation, electric-arc discharge, or different form of chemical vapor deposition. Density gradient ultracentrifugation (DGU) may be applied to separate CNTs by density. In order to separate the grown tubes, the CNTs are mixed with surfactant and water and sonicated until satisfactory separation occurs. This solution is then sprayed onto the desired substrate in order to create a CNT thin film. The film is then rinsed in water in order to get rid of excess surfactant.

Figure 4A:
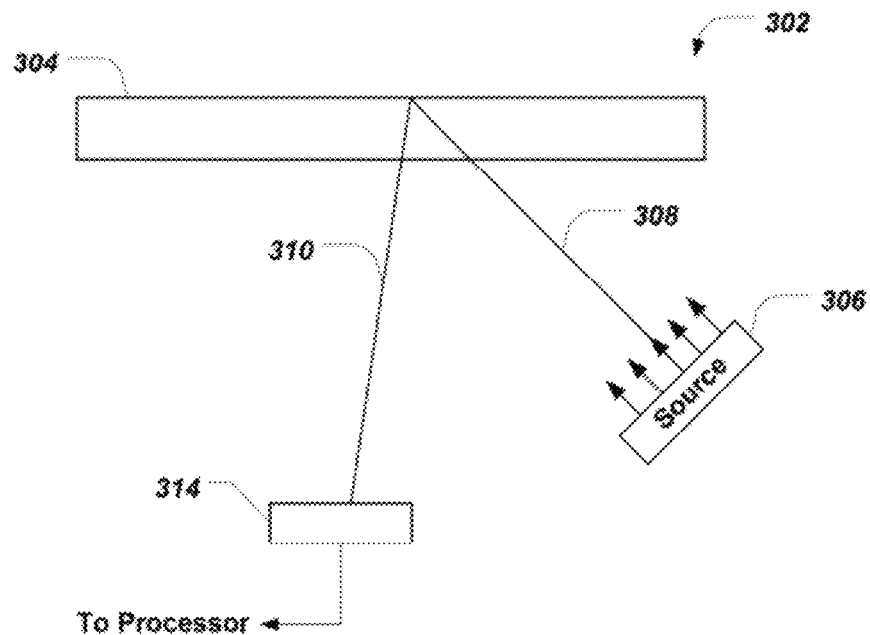
FIG. 4A is one embodiment of an electromagnetic wave biometric sensor.

FIG. 4A shows one embodiment of a biometric sensor comprising an electromagnetic sensor 302. In one embodiment, the electromagnetic sensor 302 comprises an electromagnetic wave source 306. In one embodiment, the electromagnetic wave source 306 can produce any suitable electromagnetic wave, including a light wave (e.g., an electromagnetic wave in the visible light spectrum) or a radio-frequency wave. The electromagnetic wave source 306 produces a transmitted electromagnetic wave 308 which is directed at an imaging surface 304. When the transmitted electromagnetic wave 308 encounters a biometric signature, e.g., a finger with fingerprint or a palm with palm-print (not shown), the transmitted electromagnetic wave 308 is reflected. The reflected electromagnetic wave 310 is directed towards an imaging device 314. The imaging device 314 is connected to the signal processing module 104 (FIG. 2), which generates a contour image of the biometric signature according to the electrical image data received from the imaging device 314.

Figure 4B:
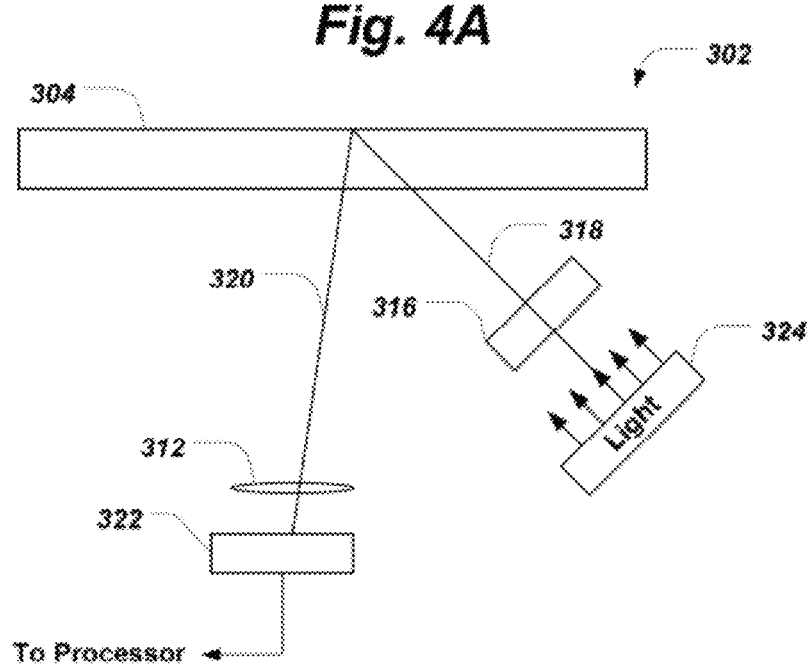
FIG. 4B is one embodiment of an optical biometric sensor.

FIG. 4B shows one embodiment of an electromagnetic sensor 302 comprising an optical sensor. In this embodiment, the electromagnetic source 306 is replaced with a light source 324 which produces an electromagnetic wave in the visible light spectrum, e.g., 390-750 nanometers. A light wave 318 passes through an optical component 316 which causes the light entering the optical component 316 to form a plurality of interference fringes on a biometric signature placed on the imaging surface 304. The optical component 316 may be a grating, a bi-prism, or composed of a single slit and a double-slit configured to create interference fringes on a biometric signature. The light wave 318 is reflected by a biometric signature in contact with the imaging surface 304 in the direction of a charge-coupled device 322. In one embodiment, the reflected light wave 320 passes through the lens 312 before interacting with the charge coupled device 322. The lens 312 may be employed to increase the sensing efficiency of the charge coupled device 322. In one embodiment, the charge-coupled device 322 comprises one or more photosites positioned to receive the reflected light wave 320 (e.g., electromagnetic wave) from the imaging surface 304. In one embodiment, the photosites are configured to produce a signal in response to the light wave 320 (e.g., electromagnetic wave). In one embodiment, the one or more photosites comprise light-sensitive semiconductor devices such as, for example, light-sensitive diodes, transistors, and the like.

In one embodiment, the imaging surface 304 may comprise a transparent conducting film (TCF), which may be fabricated from either organic or inorganic materials. Inorganic films may be constructed of a layer of transparent conducting oxide (TCO), generally in the form of indium tin oxide (ITO), fluorine doped tin oxide (FTO), and doped zinc oxide. Organic films may be constructed of carbon nanotube networks and graphene. Transparent conducting folms act both as a window for light to pass through to the active material beneath and as an ohmic contact for carrier transport out of the photovoltaic. Transparent materials possess bandgaps with energies corresponding to wavelengths which are shorter than the visible range (380 nm to 750 nm). As such, photons with energies below the bandgap are not collected by these materials and this visible light passes through.

Figure 5:
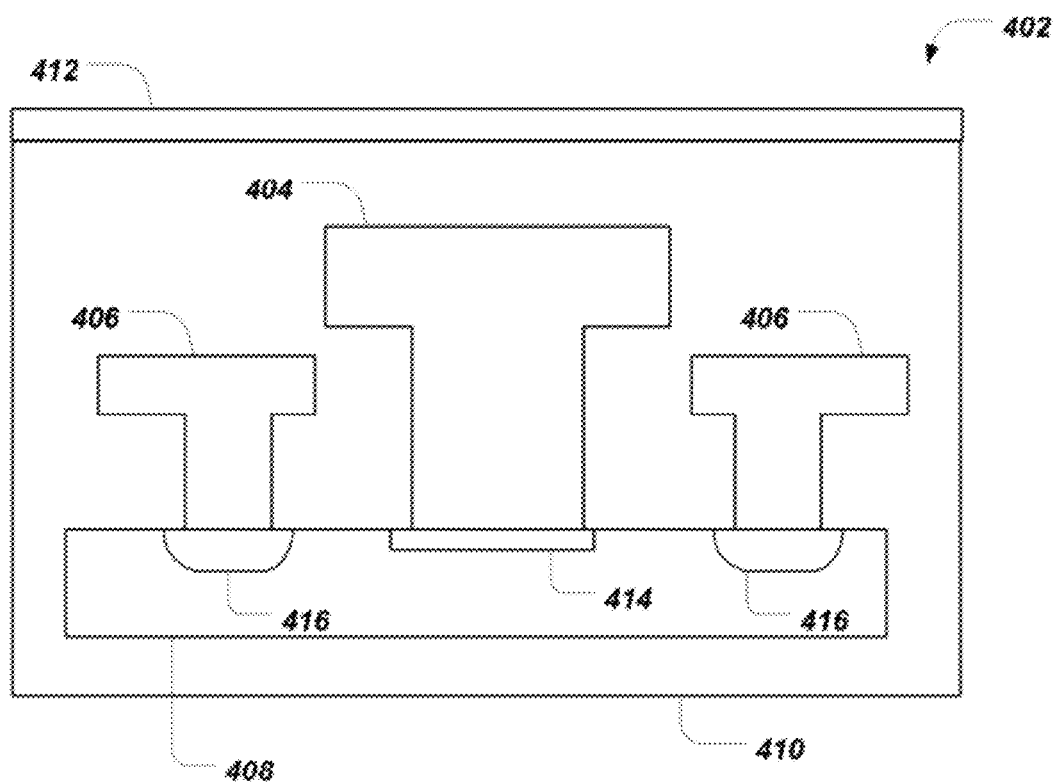
FIG. 5 is one embodiment of a thermal biometric sensor.

FIG. 5 shows one embodiment of a biometric sensor comprising a thermal sensor 402. A contact interface 414 may comprise a Schottky rectifier formed between a semiconductor 408 and a suitable metal 404. The thermal sensor 402 has first and second metal contacts 404 and 406, which serve as diode terminals. The first and second metal contacts 404, 406 can be formed of any suitable metal, for example, aluminum.

In the illustration of FIG. 5, N+ islands 416 ensure that the contacts at the terminals 406 are ohmic contacts. An insulating oxide 410 may surround the diode device structure. The insulating material 410 may be an oxide from metal or semiconductor, or an organic material. The first and second metal contacts 404, 406 create sensor pixels which are capable of generating heat images. A conductive/semiconductive layer 412 can be placed over the sensor pixels to protect the sensor from potential electrical harm and accidental electromagnetic discharge.

In operation, an array of thermal sensors 402 may be surreptitiously integrated with a contact surface, such as a wall or a vehicle hood. The sensors generate a temperature difference between the sensor and the suspect's biometric signature. The sensors then monitor the rate at which heat is drawn away from the sensor and into the biometric signature. Where a ridge of the biometric signature is in contact with the imaging surface, heats is transferred at a higher rate. Where a valley of the biometric signature is located, there exists a layer a insulating air between the sensor and the biometric signature, and therefore heat is transferred at a slower rate, allowing the sensor to build an image of the biometric signature.

Figure 6:
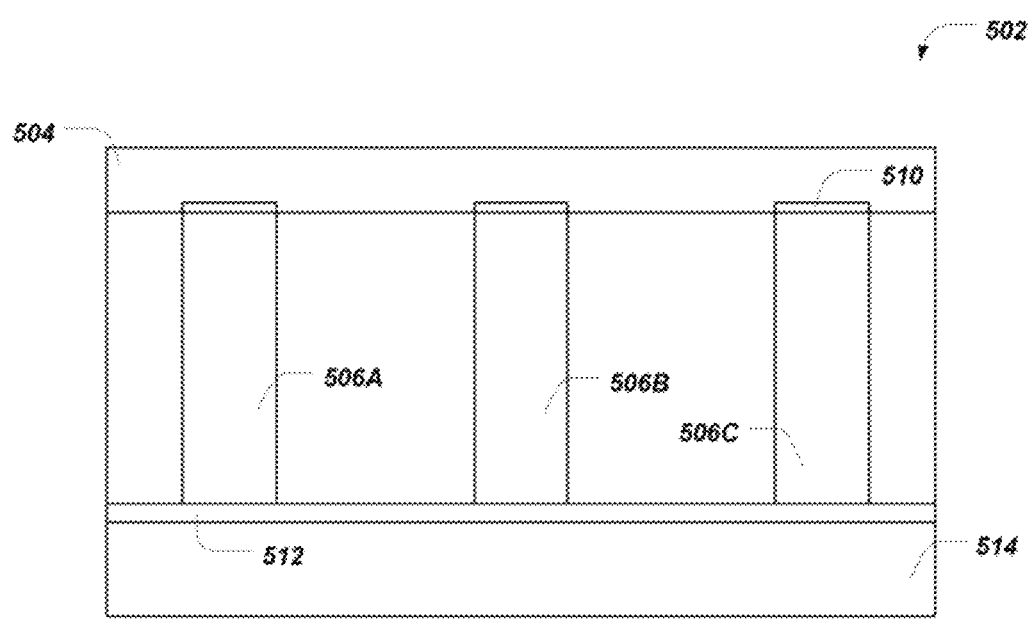
FIG. 6 is one embodiment of an ultrasonic biometric sensor.

FIG. 6 shows one embodiment of a biometric sensor comprising an ultrasonic sensor 502. In one embodiment, the ultrasonic sensor 502 comprises multiple piezoelectric elements 506, configured in a two-dimensional array. First and second conductors 510, 512 are connected to each of the piezoelectric elements 506. A shield layer 504 is applied to one side to provide a protective coating where a finger can be placed proximate to the ultrasonic sensor 502. A support 514 can be attached to the opposite end of the sensor array.

In operation, the ultrasonic sensor 502 functions by using the piezoelectric elements to generate sonic waves. These waves are transmitted through the shield layer 504 and come into contact with a suspect's biometric signature. The sonic waves are then reflected at varying speeds and frequencies which can be captured by the conductors and used to generate a signal representing the biometric signature placed on the shield layer 504.

Figure 7:
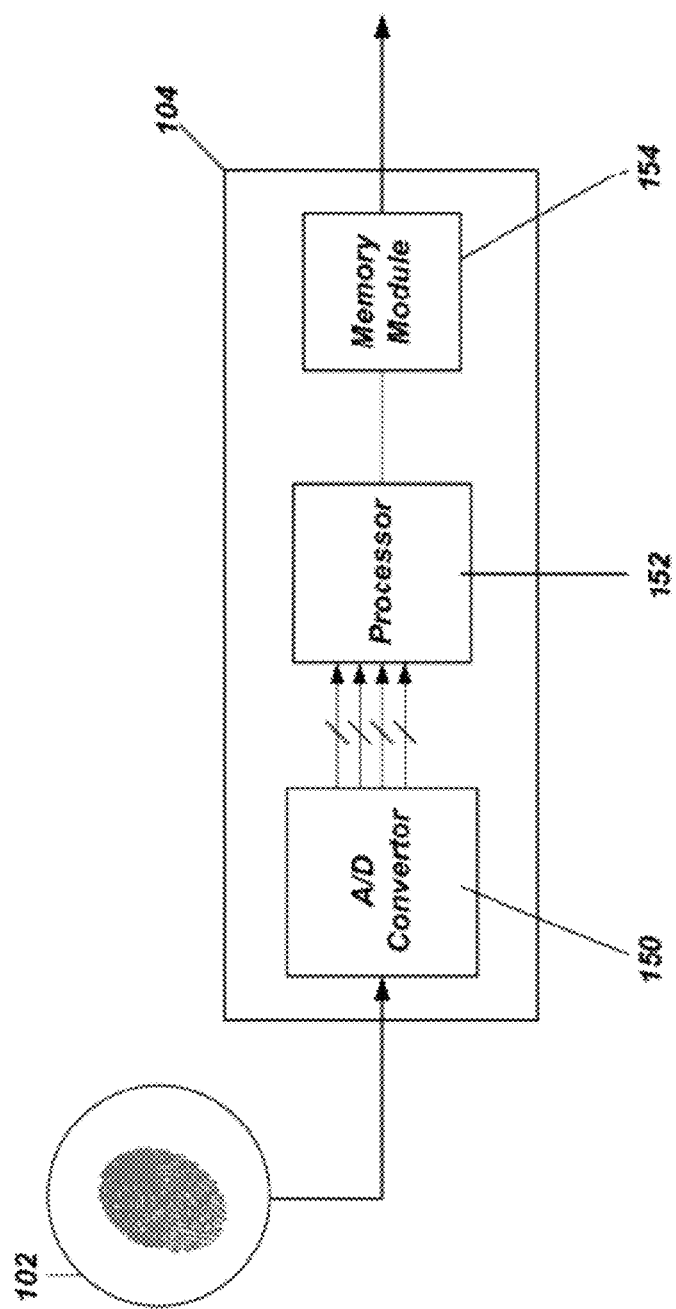
FIG. 7 is one embodiment of a signal processing module.

FIG. 7 shows one embodiment of signal processing module 104. In one embodiment, the signal processing module 104 comprises an analog-to-digital converter 150, a processor 152, and a memory module 154. The signal received from the biometric sensor 102 is in the form of an analog signal. The analog-to-digital converter 150 converts the analog signal into a machine-readable digital form. The digital signal is then passed to the processor 152 for processing. After the signal has been processed, digital data representing the biometric signature of the suspect is stored in the memory module 154. The memory module 154 can be any form of machine readable memory, including but not limited to, solid state memory or magnetic memory. The memory module is readable by the communications module 106.

Figure 8:
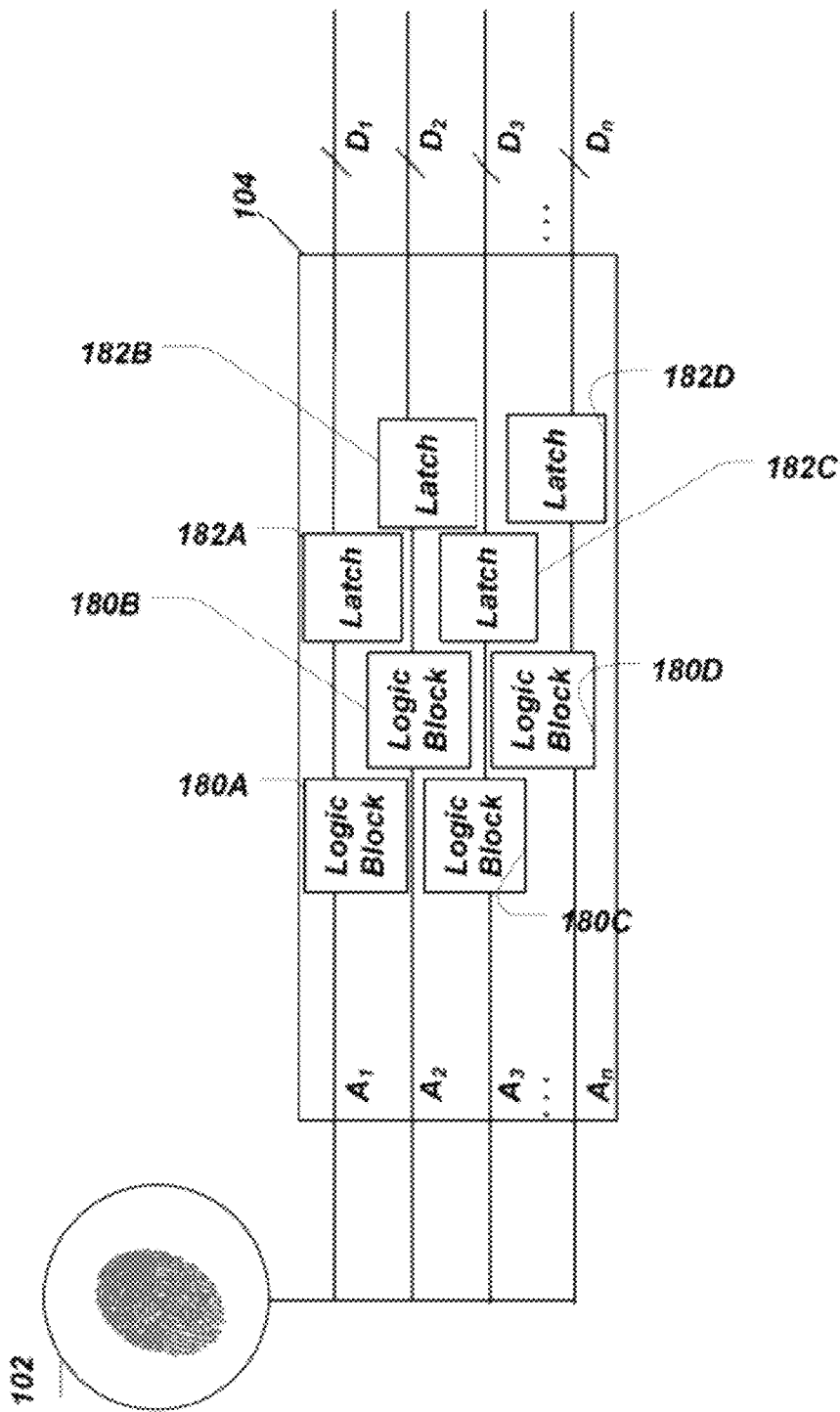
FIG. 8 is one embodiment of a signal processing module.

FIG. 8 shows a second embodiment of a signal processing module 104. In one embodiment, the signal processing module 104 shown in FIG. 8 comprises one or more logic blocks 180 and one or more data latches 182. The analog signal received from the biometric sensor 102 is input into the logic blocks 180, where a series of logic gates and registers process the analog signal. The result of this processing is stored by the latches 182 and is accessible by the communications module 106.

Figure 9:
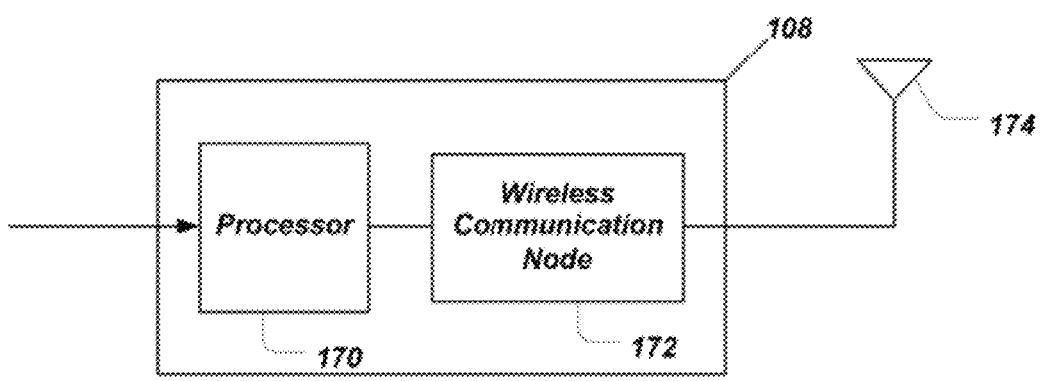
FIG. 9 is one embodiment of a first processing node.

FIG. 9 shows one embodiment of a first processing node 108. In one embodiment, the first processing node 108 comprises a processor 170 and a wireless communication node 172 communicatively coupled to the processor 170. The wireless communication node 172 is coupled to an antenna 174.

The processor 170 receives an input from the communication module 106 (FIG. 2). The wireless communication node 172 can be configured to use any suitable wireless communication protocol, for example, Institute of Electrical and Electronics Engineers (IEEE) 802.11, WiFi, Global System for Mobile Communications (GSM), code division multiple access (CDMA), or any other suitable wireless communication protocol.

Figure 10:
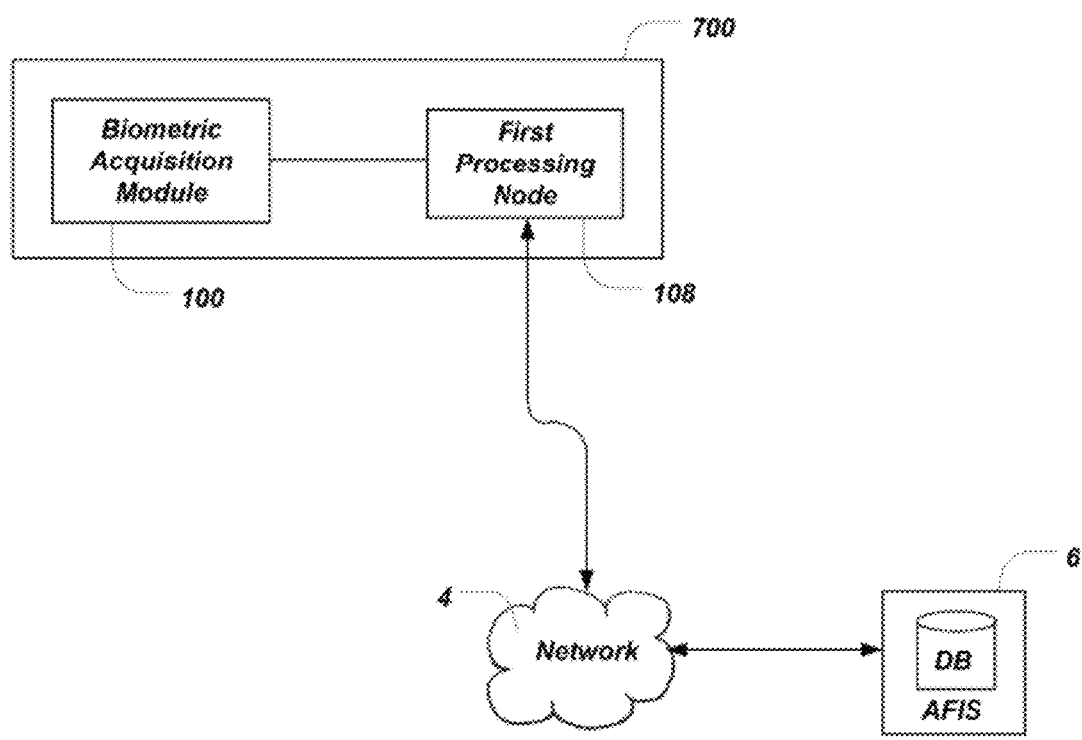
FIG. 10 is one embodiment of a surreptitious biometric acquisition apparatus and network for identifying a subject.

FIG. 10 shows one embodiment of how the biometric acquisition module 100 and first processing node 108 may cooperate in a larger system. Upon acquiring the biometric signature of a suspect is obtained by the biometric acquisition module 100, the biometric signature is transmitted to the first processing node 108. In one embodiment, the biometric acquisition module 100 and the first processing node 108 may be located within a shared structure 700, such as a vehicle or a building. After processing the biometric signature, the first processing node 108 transmits the biometric signature to the database 6 via the network 4. Upon receipt of the biometric signature, the database 6 will perform a search to attempt to match the biometric signature obtained by the biometric acquisition module 100 with known biometric data included in the database. If a match is found, the database 6 may transmit the suspect's information to the first processing node 108 via the network 4. In one embodiment, the database 6 may transmit the suspect's information to a different location than the first processing node 108 (not shown). In one embodiment, the suspect data may include a photo, criminal record, personal information, and dangerousness.

Figure 11:
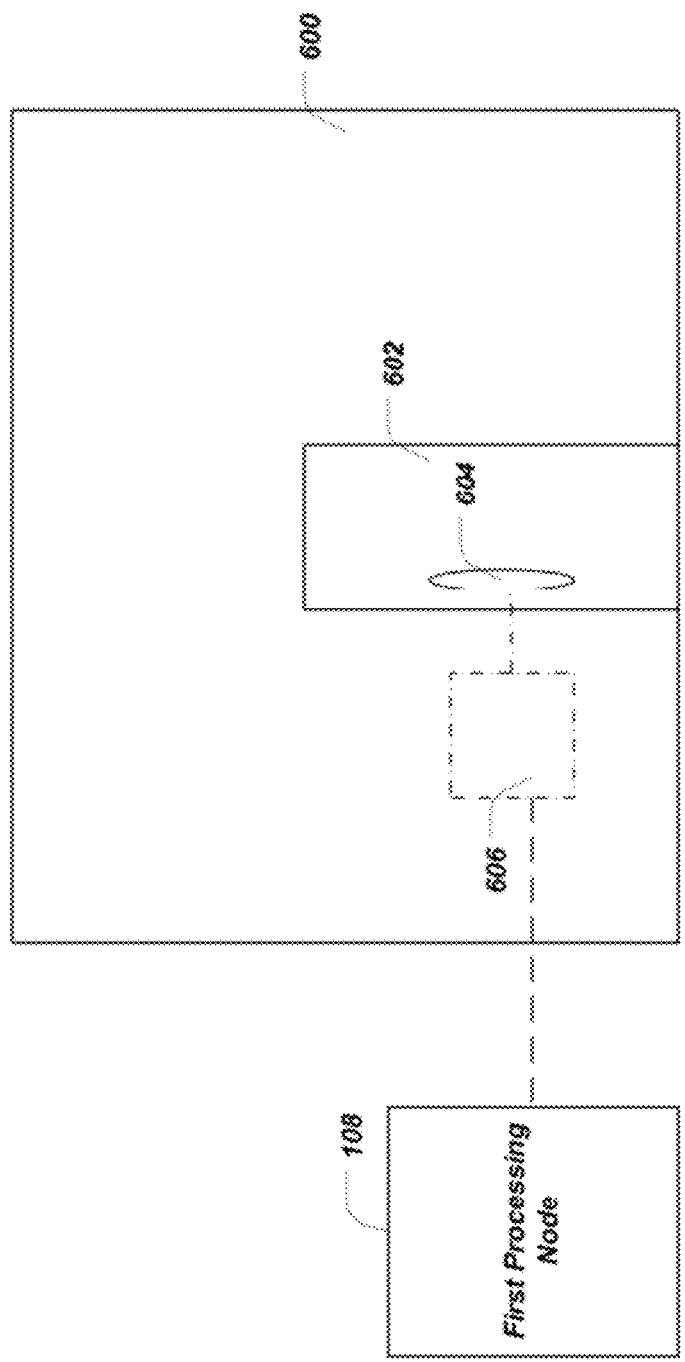
FIG. 11 is one embodiment of a surreptitious biometric acquisition apparatus embedded in a building.

FIG. 11 shows one embodiment of a surreptitious biometric acquisition apparatus for use in building security. In one embodiment, the biometric sensor 102 (FIGS. 2, 7, 8) may be mounted to a door handle 604 of a door 602 of a building 600. When a person comes in contact with the door handle 604, for example, by pulling on the handle 604 to open the door 602, the person's biometric signature can be recorded by the biometric sensor 102. The signal processing module 104 and the communications module 106 (FIGS. 2, 7, 8, 9) may be located in a control box 606. In one embodiment, the control box 606 may be embedded into the building 600. In one embodiment, first processing node 108 may be located within the building 600. In another embodiment, the first processing node 108 may be located in an offsite location, such as a security building or remote monitoring location. In one embodiment, the surreptitious biometric acquisition apparatus shown in FIG. 11 may be used in either a passive or active capacity. For example, in a passive role, the biometric sensor 102 can be used to log each person who enters a certain building. The data can be stored by the first processing node 108 or can be transmitted by the first processing node 108 to another location for further processing. In an active role, the biometric sensor 102 can be used to control access to the building, by tying a biometric acquisition module comprising the biometric sensor 102 into a door lock. When the first processing node 108 identifies a person authorized to access the building 600, the first processing node 108 can trigger the door lock and allow access to the building 600.

In another embodiment, a surreptitious biometric acquisition apparatus 100 may be installed on an automated teller machine (ATM) for use in bank access and security. The surreptitious biometric acquisition apparatus could function to ensure that only an authorized user, such as a person who has registered their biometric data with the financial institution, is able to access a specific account. This would assist in situations where a suspect has stolen an ATM card and is attempting to access an account illegally. The surreptitious biometric acquisition apparatus 100 may log the suspect's information or may prevent access to an account by an unauthorized person.

Figure 12:
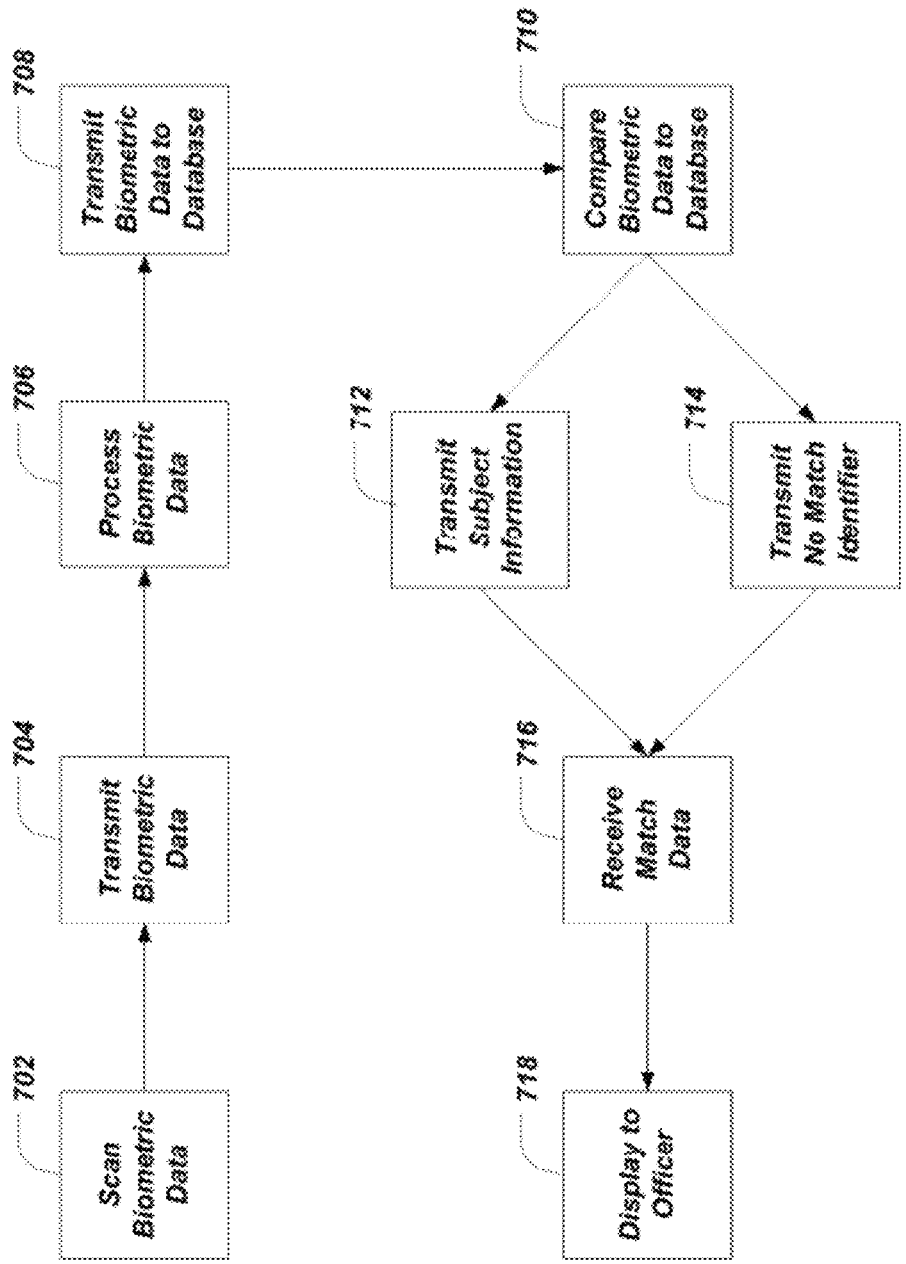
FIG. 12 is a flow chart of one aspect of a method for surreptitiously identifying a subject using biometric acquisition apparatus.

FIG. 12 shows one embodiment of one aspect of a method for surreptitiously identifying a suspect using biometric data. Biometric data is obtained 702 from a subject and is transmitted 704 for processing. The biometric data is processed 706 to create a biometric signature that can be compared to known biometric data. The biometric signature is transmitted 708 to a database containing known biometric data, where it is compared 710 to the known biometric data. If a match is found with known biometric data, the information contained in the database connected to the biometric data is transmitted 712. In one embodiment for law enforcement use this data may include name, identifying features, image of suspect, criminal record, threat level, or arrest warrants. In another embodiment for civilian use, this information may include name, employee number, or security clearance. If no match is found, an identifier indicating no match in the database is transmitted 714. The transmitted data is received 716 and displayed 718 to the officer.

Figure 13:
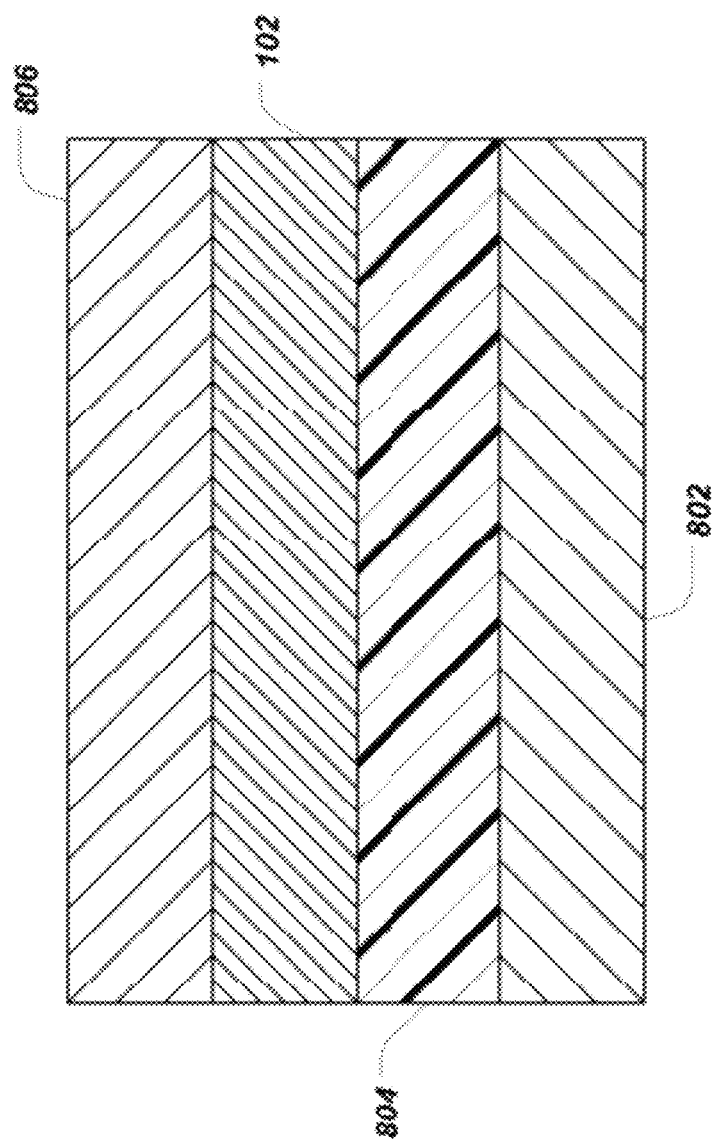
FIG. 13 shows one embodiment of a cross-section of the vehicle hood with a surreptitiously mounted biometric sensor.

FIG. 13 shows one embodiment of a cross-section of the vehicle hood 110 with a surreptitiously mounted biometric sensor. The vehicle hood 110 may comprise a metal base layer 802. A primer coating 804 may be applied over the metal base 802 to protect the metal base 802 from rusting and provide a better surface for surreptitious application of the biometric sensor 102 and top coating 806. In one embodiment, the top coating 806 completely covers the biometric sensor and prevents a suspect from being able to identify the location of the biometric sensor 102 integrated with vehicle hood 110. The biometric sensor 102 may comprise any suitable biometric sensor, for example, capacitive, thermal, electromagnetic, optical, or ultrasonic sensors. The top coating 806 material may be configured to match the properties of the biometric sensor 102 and to enable surreptitious mounting. For example, the top coat 806 may be chosen to be an electrically conductive material when a capacitive biometric sensor is used. As another example, a translucent material may be chosen for the top coat 806 when the biometric sensor 102 is an optical biometric sensor. Other materials may be chosen to match the operative parameters and requirements of the biometric sensor 102. In one embodiment, the top coat 806 may cover the entire surface of the hood. In another embodiment, the top coat 806 may only cover the surface area of the biometric sensor 102. In this embodiment, the top coat 806 should be chosen to match the color of the rest of the vehicle hood 110 to allow for surreptitious mounting.

Figure 14:
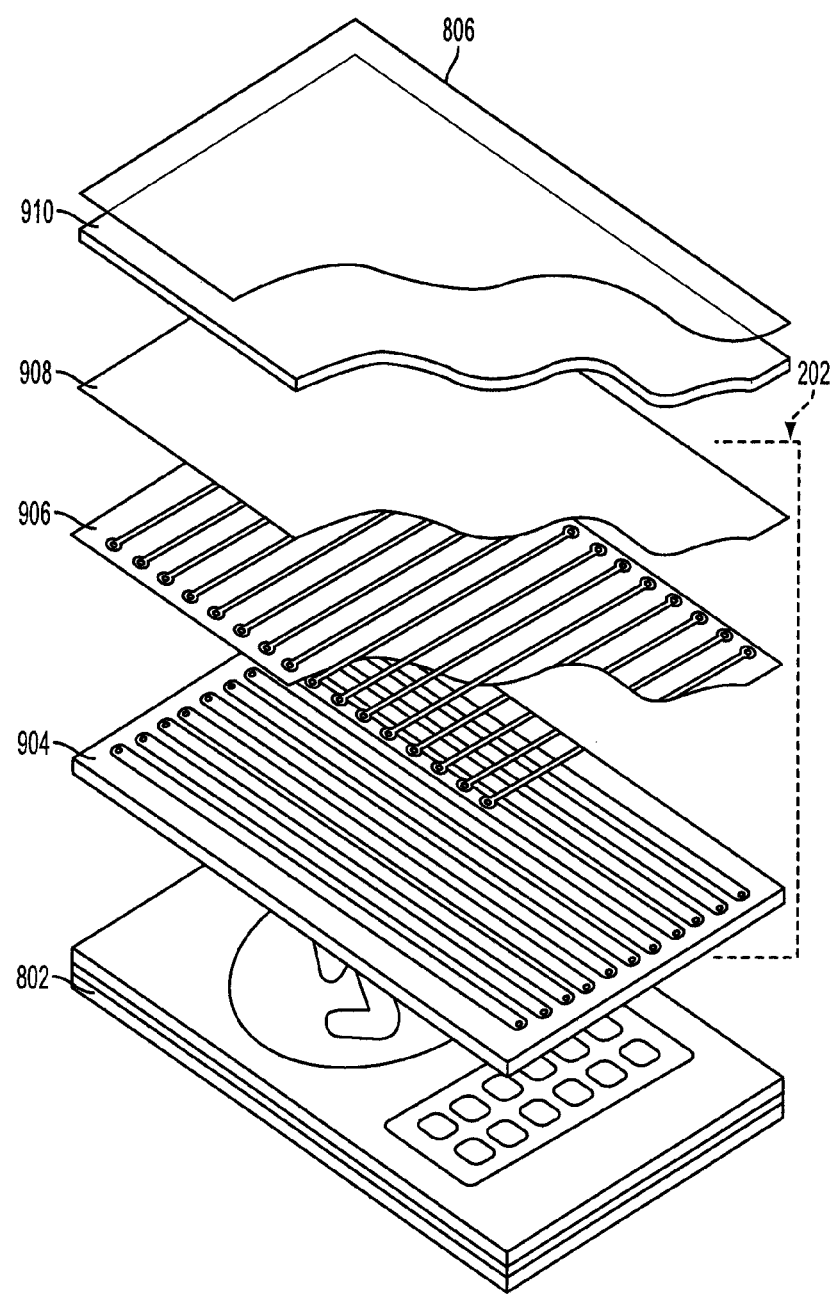
FIG. 14 shows one embodiment of a cross-sectional view of the vehicle hood with a capacitive biometric sensor surreptitiously mounted.

FIG. 14 shows one embodiment of a cross-sectional view of the vehicle hood 110 with a capacitive biometric sensor 202 surreptitiously mounted. In one embodiment, the vehicle hood 110 may comprise a metal base 802 and a primer coating 804 (not shown). A surreptitious biometric sensor may be mounted to the vehicle hood 110. In one embodiment shown in FIG. 14, the surreptitious biometric sensor is a capacitive sensor 202. The capacitive sensor 202 may comprise a substrate layer 904. The substrate layer 904 may be made of any suitable substrate material, for example, glass. A capacitive grid 906 is formed on the substrate layer 904, for example, by connecting a plurality of capacitive plates and amplifiers as shown in FIG. 2. In one embodiment, a sealing layer 908 is formed over the capacitive grid 906 to protect the capacitive grid 906 from environmental contaminants. An insulating layer 910 is formed over the capacitive grid 906 and option sealing layer 908. The insulating layer 910 provides a uniform contact surface for a suspect's biometric signature. A top coating material 806 is placed over the capacitive sensor 202, covering the capacitive sensor 202 and preventing identification of the location or presence of the capacitive sensor 202. The top coating material 806 can be any suitable material, for example, a conductive paint, which allows for proper functioning of the capacitive sensor 202. Although surreptitious mounting has been discussed and illustrated with reference to a capacitive sensor 202, it will be appreciated by one skilled in the art that a similar structure may be used to surreptitiously mount any suitable biometric sensor, for example, thermal, optical, electromagnetic, or ultrasonic.

Various elements of the fingerprinting apparatus, system, and method disclosed herein may be implemented in a dedicated or general purpose computing environment comprising a computing device, one or more processor circuits or processing units, one or more memory circuits and/or storage circuit component(s), and one or more input/output (I/O) circuit devices.

In one embodiment, a processing unit may be responsible for executing various software programs such as system programs, applications programs, and/or modules to provide computing and processing operations for the computing device. The processing unit may be responsible for performing various voice and data communications operations for the computing device such as transmitting and receiving voice and data information over one or more wired or wireless communications channels. Although the processing unit of the computing device includes single processor architecture as shown, it may be appreciated that the computing device may use any suitable processor architecture and/or any suitable number of processors in accordance with the described embodiments. In one embodiment, the processing unit may be implemented using a single integrated processor.

The processing unit may be implemented as a host central processing unit (CPU) using any suitable processor circuit or logic device (circuit), such as a as a general purpose processor. The processing unit also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device, such as a DSP in accordance with the described embodiments.

The processing unit may be coupled to the memory and/or storage component(s) through a bus. The memory bus may comprise any suitable interface and/or bus architecture for allowing the processing unit to access the memory and/or storage component(s). Although the memory and/or storage component(s) may be separate from the processing unit, it is worthy to note that in various embodiments some portion or the entire memory and/or storage component(s) may be included on the same integrated circuit as the processing unit. Alternatively, some portion or the entire memory and/or storage component(s) may be disposed on an integrated circuit or other medium (e.g., hard disk drive) external to the integrated circuit of the processing unit. In various embodiments, the computing device may comprise an expansion slot to support a multimedia and/or memory card, for example.

The memory and/or storage component(s) represent one or more computer-readable media. The memory and/or storage component(s) may be implemented using any computer-readable media capable of storing data such as volatile or non-volatile memory, removable or non-removable memory, erasable or non-erasable memory, writeable or re-writeable memory, and so forth. The memory and/or storage component(s) may comprise volatile media (e.g., random access memory (RAM)) and/or nonvolatile media (e.g., read only memory (ROM), Flash memory, optical disks, magnetic disks and the like). The memory and/or storage component(s) may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

One or more I/O devices allow a user to enter commands and information to the computing device, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device may comprise an alphanumeric keypad coupled to the processing unit. The keypad may comprise, for example, a QWERTY key layout and an integrated number dial pad. The computing device may comprise a display coupled to the processing unit. The display may comprise any suitable visual interface for displaying content to a user of the computing device. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit may be arranged to provide processing or computing resources to the computing device. For example, the processing unit may be responsible for executing various software programs including system programs such as operating system (OS) and application programs. System programs generally may assist in the running of the computing device and may be directly responsible for controlling, integrating, and managing the individual hardware components of the computer system. The OS may be implemented, for example, using products known to those skilled in the art under the following trade designations: Microsoft Windows OS, Symbian OSTM, Embedix OS, Linux OS, Binary Run-time Environment for Wireless (BREW) OS, JavaOS, Android OS, Apple OS or other suitable OS in accordance with the described embodiments. The computing device may comprise other system programs such as device drivers, programming tools, utility programs, software libraries, application programming interfaces (APIs), and so forth.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

It also is to be appreciated that the described embodiments illustrate example implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual aspects described and illustrated herein has discrete components and features which may be readily separated from or combined with the features of any of the other several aspects without departing from the scope of the present invention. Any recited method can be carried out in the order of events recited or in any other order which is logically possible.

In the foregoing specification, various specific embodiments of a fingerprinting apparatus, system, and method have been disclosed. It will be evident that various modifications may be made to the disclosed embodiments without departing from the broader scope of the fingerprinting apparatus, system, and method as set forth in the appended claims. Accordingly, the specification and drawings of this disclosure should be regarded in an illustrative sense rather than a restrictive sense.

What is claimed is:

1. A surreptitious biometric acquisition apparatus, comprising
   a sensor configured to produce an electrical signal corresponding to a biometric signature of a subject, wherein the sensor is surreptitiously mounted to a surface to prevent detection of a location and presence of the sensor, wherein the surface comprises a law enforcement vehicle; and
   a signal processing module configured to convert the electrical signal to a digital signal.

2. The apparatus of claim 1, wherein the sensor comprises a capacitive element.

3. The apparatus of claim 2, wherein the capacitive element comprises an array of conductive elements having a first spacing and a second spacing.

4. The apparatus of claim 3, wherein the conductive elements of the capacitive element comprise:
   a first conductor plate and a second conductor plate embedded in an insulating material;
   an amplifier connected to the first and second conductor plates, wherein the output of the amplifier is a stored voltage between the first plate and the second plate.

5. The apparatus of claim 3, wherein the sensor is configured to output a difference in voltage between a first conductive element and one or more adjacent conductive elements in response to the subject contacting the sensor.

6. The apparatus of claim 3, wherein the sensor is configured to output a difference in voltage between a first conductive element and a reference voltage in response to the subject contacting the sensor.

7. The apparatus of claim 3, wherein the first spacing is substantially equal to the second spacing.

8. The apparatus of claim 3, wherein the first spacing is not substantially equal to the second spacing.

9. The apparatus of claim 1, wherein the sensor comprises a thermal element.

10. The apparatus of claim 9, wherein the thermal sensor comprises:
    an imaging surface;
    an array of heat sensing elements configured to detect the temperature of the imaging surface at discrete points in response to the subject contacting the sensor.

11. The apparatus of claim 1, wherein the sensor comprises an electromagnetic wave sensor.

12. The apparatus of claim 11, wherein the electromagnetic wave sensor comprises:
    an imaging surface;
    an electromagnetic wave source configured to produce an electromagnetic wave in the direction of the imaging surface in response to the subject contacting the sensor;
    a charge-coupled device comprising one or more photosites positioned to receive a reflected electromagnetic wave from the imaging surface, wherein the photosites are configured to produce a signal in response to the electromagnetic wave.

13. The apparatus of claim 12, wherein the electromagnetic wave source comprises a light-emitting diode and the one or more photosites comprise light-sensitive semiconductor devices.

14. The apparatus of claim 1, wherein the sensor comprises an ultrasonic element.

15. The apparatus of claim 1, wherein the signal processing module comprises:
    an analog-to-digital converter;
    a processor coupled to the analog-to-digital converter; and
    a memory unit configured to store the output of the processor.

16. The apparatus of claim 1, wherein the signal processing module comprises a plurality of gates.

17. The apparatus of claim 1, further comprising:
    a communication module coupled to the signal processing module.

18. The apparatus of claim 17, wherein the communication module is configured to communicate with a first processing node.

19. The apparatus of claim 18, wherein the first processing node comprises:

a processor configured to process a signal from the communication module; and a wireless communication node coupled to the processor.

20. A law enforcement vehicle comprising a surreptitious biometric acquisition apparatus, the vehicle comprising:

a surreptitious biometric acquisition module comprising:

a sensor configured to produce an electrical signal corresponding to a biometric signature of a subject, wherein the sensor is formed integrally with the law enforcement vehicle to prevent detection of a location and presence of the sensor;

a signal processing module configured to convert the electrical signal to a digital signal; and a communication module coupled to the signal processing module and configured to communicate with a first processing node;

the first processing node comprising:

a processor configured to process the signal from the communication module; and a wireless communication module coupled to the processor.

21. A method for surreptitiously identifying a subject, comprising obtaining, via a biometric sensor, an analog signal representing biometric data of the subject, wherein the biometric sensor is surreptitiously mounted to a surface to prevent detection of a location and presence of the biometric sensor, wherein the surface comprises an outer surface of a law enforcement vehicle;

converting, via a signal processing module, the analog signal into a digital signal;

transmitting, via a first communication module, the digital signal to a first processing node;

processing, via the first processing node, the digital signal;

transmitting, via a second communication module, the digital signal to a second processing node;

comparing, via the second processing node, the biometric data of the subject to a database of known biometric information;

transmitting, via a third communication module, identifying information of the subject;

receiving, via the second communication node, the identifying information for the subject.

22. The surreptitious biometric acquisition apparatus of claim 1, wherein the sensor comprises a fingerprint sensor.

23. The law enforcement vehicle of claim 20, wherein the sensor comprises a fingerprint sensor.

24. The method of claim 21, wherein the sensor comprises a fingerprint sensor, the method comprising obtaining, via the fingerprint sensor, an analog signal representing fingerprint data of the subject, wherein the fingerprint sensor is surreptitiously mounted to the law enforcement vehicle to prevent detection of a location and presence of the fingerprint sensor.

* * * * *

UNITED STATES PATENT AND TRADEMARK OFFICE
CERTIFICATE OF CORRECTION

| | |
|---|---|
| PATENT NO. | : 8,710,956 B2 |
| APPLICATION NO. | : 13/154064 |
| DATED | : April 29, 2014 |
| INVENTOR(S) | : Longo |

Page 1 of 1

It is certified that error appears in the above-identified patent and that said Letters Patent is hereby corrected as shown below:

In the Specification

In Column 6, Line 53, delete "folms" and insert -- films --, therefor.

In the Claims

In Column 13, Line 59, in Claim 1, delete "comprising" and insert -- comprising: --, therefor.

In Column 15, Line 23, in Claim 21, delete "comprising" and insert -- comprising: --, therefor.

Signed and Sealed this
Sixteenth Day of September, 2014

Michelle K. Lee
*Deputy Director of the United States Patent and Trademark Office*